UNITED STATES PATENT OFFICE.

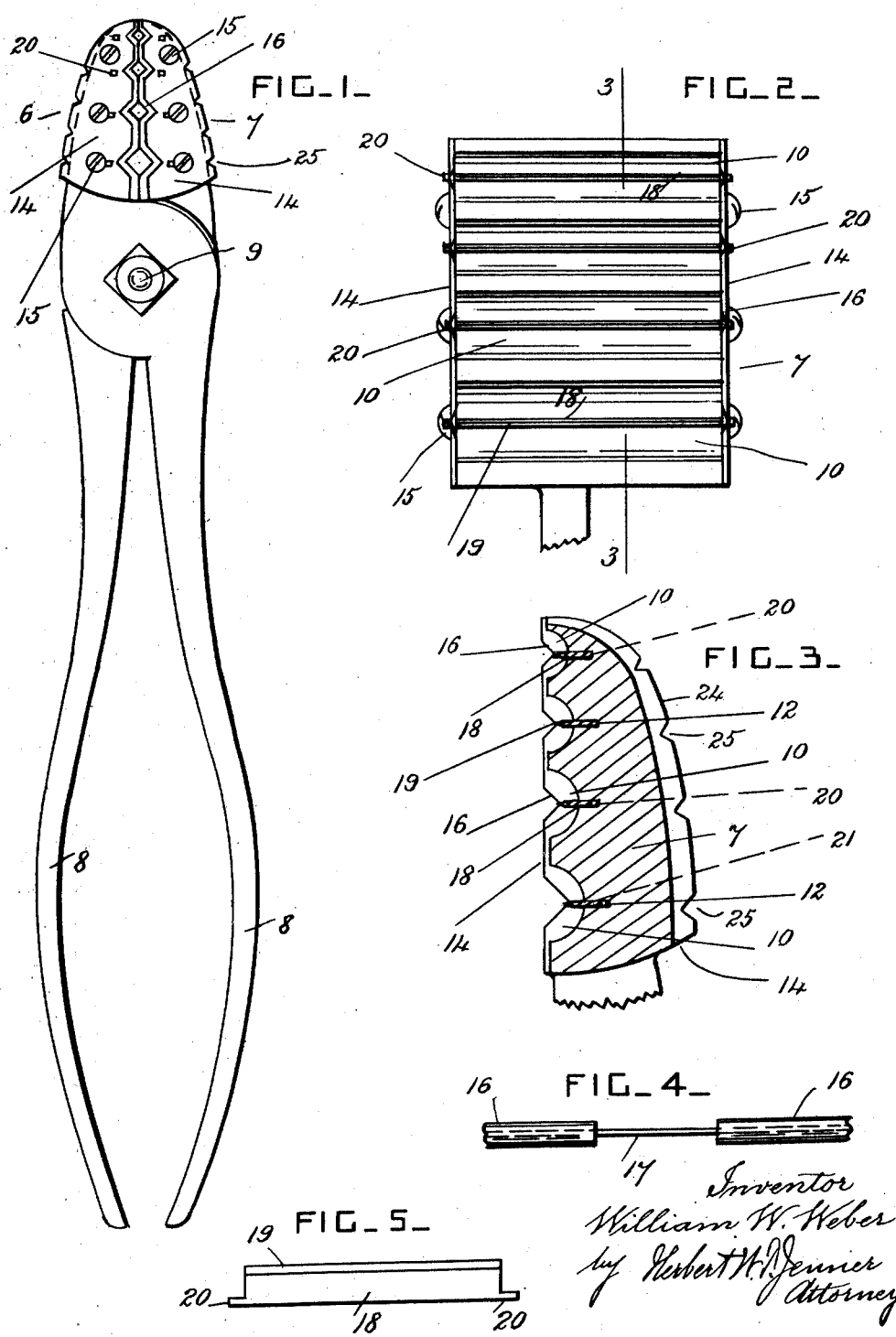

WILLIAM W. WEBER, OF SACRAMENTO, CALIFORNIA.

INSULATION-CUTTER.

1,396,903.  Specification of Letters Patent.  Patented Nov. 15, 1921.

Application filed July 8, 1921. Serial No. 483,206.

*To all whom it may concern:*

Be it known that I, WILLIAM W. WEBER, a citizen of the United States, residing at Sacramento, in the county of Sacramento and State of California, have invented certain new and useful Improvements in Insulation-Cutters, of which the following is a specification.

This invention relates to cutters for removing portions of the insulating coverings of wires used for the transmission of electric currents; and it consists in the novel construction and combination of the parts hereinafter fully described and claimed.

In the drawings, Figure 1 is a side view of an insulation cutter constructed according to this invention. Fig. 2 is a face view of a portion of one of the jaws, drawn to a greatly enlarged size, for clearness. Fig. 3 is a cross-section through the jaws, taken on the line 3—3 in Fig. 2. Fig. 4 is a portion of insulated wire showing how part of the insulation is cut away. Fig. 5 is a detail view of one longitudinal blade 18.

The cutter is provided with opposed jaws 6 and 7, and has crossed and pivoted handles 8 which work on the pivot 9 like shears. The jaws are provided with a series of cutting devices of different size, so as to cut insulation from insulated wires of different size, and as these devices are all alike the description will be confined to one of them.

Each jaw has a channel 10 formed crosswise in its face, and these channels register with each other when the jaws are closed. Each channel 10 has a narrow slot 12 at its bottom. Cutter plates 14 are secured to the ends of the jaws by screws 15, and these cutter plates have V-shaped cutting edges 16 for cutting the insulation crosswise on opposite sides of the wire 17.

Longitudinal blades 18 having sharp cutting edges 19 are inserted in the slots 12, and their cutting edges project toward each other. Projections 20 are formed on the ends of the blades 18, and are inserted in holes 21 in the cutter plates, so that the blades 18 are secured in place.

When the device is used to scrape the wire as well as to cut away portions of its insulation 16, the cutter plates 14 are made so that their outer portions 24 overlap the backs of the jaws, and have scraper notches 25 formed in them. These notches can be V-shaped, semicircular, or any other approved shape, and the cutting edges 16 can also be variously shaped.

The opposed longitudinal blades 18 cut the insulation 16 lengthwise on the wire 17 when closed down upon the wire, and the cutter plates 14 cut the insulation crosswise, so as to form exposed places as shown in Fig. 4.

What I claim is:

1. An insulation cutter provided with jaws having pivoted handles, said jaws having series of opposed channels extending crosswise in their faces and arranged parallel to each other, said channels decreasing in size in proportion to their distance from the pivot of the handles, cutter plates secured to the ends of the jaws and provided with series of cutting edges arranged at the ends of the said grooves and proportioned similarly to them, and series of opposed longitudinal blades arranged in the said channels and secured to the jaws independently of the cutter plates.

2. An insulation cutter provided with jaws having crossed and pivoted handles, said jaws having opposed channels extending crosswise in their faces, cutter plates secured to the ends of the jaws and adapted to cut the insulation crosswise of the wire, said cutter plates being arranged to project beyond the backs of the jaws and being provided with scraping edges, and opposed longitudinal blades secured to the said jaws and projecting toward each other in the said channels.

In testimony whereof I have affixed my signature.

WILLIAM W. WEBER.